United States Patent
Jackson (10) Patent No.: US 7,806,366 B2
(45) Date of Patent: Oct. 5, 2010

(54) SYSTEMS AND METHODS FOR CAPTURING AND CONTROLLING POST-RECOVERY MOTION OF UNMANNED AIRCRAFT

(75) Inventor: Clifford Jackson, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 726 days.

(21) Appl. No.: 11/775,600

(22) Filed: Jul. 10, 2007

(65) Prior Publication Data

US 2010/0025528 A1 Feb. 4, 2010

(51) Int. Cl.
*B64F 1/02* (2006.01)
(52) U.S. Cl. .................................. 244/110 F
(58) Field of Classification Search ........... 244/110 F, 244/110 C, 110 R, 139, 113
See application file for complete search history.

(56) References Cited

U.S. PATENT DOCUMENTS

| | | | |
|---|---|---|---|
| 965,881 A | 8/1910 | Draper | |
| 968,339 A | 8/1910 | Geraldson | |
| 975,953 A | 11/1910 | Hourwich | |
| 1,144,505 A | 6/1915 | Steffan | |
| 1,164,967 A | 12/1915 | Thorp | |
| 1,317,631 A | 9/1919 | Kinser | |
| 1,383,595 A | 7/1921 | Black | |
| 1,384,036 A | 7/1921 | Anderson | |
| 1,428,163 A | 9/1922 | Harriss | |
| 1,499,472 A | 7/1924 | Hazen | |
| 1,530,010 A | 3/1925 | Neilson | |
| 1,556,348 A | 10/1925 | Ray et al. | |
| 1,624,188 A | 4/1927 | Simon | |
| RE16,613 E | 5/1927 | Moody et al. | |
| 1,634,964 A | 7/1927 | Steinmetz | |
| 1,680,473 A | 8/1928 | Parker | |
| 1,686,298 A | 10/1928 | Uhl | |
| 1,712,164 A | 5/1929 | Peppin | |
| 1,716,670 A | 6/1929 | Sperry | |

(Continued)

FOREIGN PATENT DOCUMENTS

DE 4301671 A1 7/1993

(Continued)

OTHER PUBLICATIONS

"Ames Builds Advanced Yawed-Wing RPV," Aviation Week and Space Technology, Jan. 22, 1973, p. 73.

(Continued)

*Primary Examiner*—Timothy D Collins
*Assistant Examiner*—Michael Kreiner
(74) *Attorney, Agent, or Firm*—Perkins Coie LLP (57) ABSTRACT

Systems and methods for capturing and controlling post-recovery motion of an unmanned aircraft are disclosed herein. An aircraft system in accordance with one embodiment of the invention, for example, can include a line capture assembly carried by an unmanned aircraft having a fuselage and a lifting surface. The line capture assembly can include a flexible support line having a first portion attached to an attachment point on the fuselage and a second portion extending from the attachment point spanwise along the lifting surface of the aircraft. The line capture assembly can also include an engagement device coupled to the second portion of the support line. The engagement device is releasably secured to the lifting surface.

34 Claims, 4 Drawing Sheets

U.S. PATENT DOCUMENTS

| | | | |
|---|---|---|---|
| 1,731,091 A | 10/1929 | Belleville | |
| 1,737,483 A | 11/1929 | Verret | |
| 1,738,261 A | 12/1929 | Perkins | |
| 1,748,663 A | 2/1930 | Tucker | |
| 1,756,747 A | 4/1930 | Holland | |
| 1,777,167 A | 9/1930 | Forbes | |
| 1,816,976 A | 8/1931 | Kirkham | |
| 1,836,010 A | 12/1931 | Audrain | |
| 1,842,432 A | 1/1932 | Stanton | |
| 1,869,506 A | 8/1932 | Richardson | |
| 1,892,357 A | 12/1932 | Moe | |
| 1,909,445 A * | 5/1933 | Ahola | 244/147 |
| 1,912,723 A | 6/1933 | Perkins | |
| 1,925,212 A | 9/1933 | Steiber | |
| 1,940,030 A | 12/1933 | Steiber | |
| 1,960,264 A | 5/1934 | Heinkel | |
| 2,333,559 A | 11/1943 | Grady et al. | |
| 2,347,561 A | 4/1944 | Howard et al. | |
| 2,360,220 A | 10/1944 | Goldman | |
| 2,364,527 A | 12/1944 | Haygood | |
| 2,365,778 A | 12/1944 | Schwab | |
| 2,365,827 A | 12/1944 | Liebert | |
| 2,380,702 A | 7/1945 | Persons | |
| 2,390,754 A | 12/1945 | Valdene | |
| 2,435,197 A | 2/1948 | Brodie | |
| 2,436,240 A | 2/1948 | Wiertz | |
| 2,448,209 A | 8/1948 | Boyer et al. | |
| 2,465,936 A | 3/1949 | Schultz | |
| 2,488,050 A | 11/1949 | Brodie | |
| 2,515,205 A | 7/1950 | Fieux | |
| 2,526,348 A | 10/1950 | Gouge | |
| 2,669,403 A | 2/1954 | Milligan | |
| 2,735,391 A | 2/1956 | Buschers | |
| 2,814,453 A | 11/1957 | Trimble et al. | |
| 2,843,342 A | 7/1958 | Ward | |
| 2,844,340 A | 7/1958 | Daniels et al. | |
| 2,908,240 A | 10/1959 | Hodge | |
| 2,919,871 A | 1/1960 | Sorensen | |
| 2,933,183 A | 4/1960 | Koelsch | |
| 3,069,118 A | 12/1962 | Bernard | |
| RE25,406 E | 6/1963 | Byrne et al. | |
| 3,163,380 A | 12/1964 | Brodie | |
| 3,268,090 A | 8/1966 | Wirkkala | |
| 3,454,244 A | 7/1969 | Walander | |
| 3,468,500 A | 9/1969 | Carlsson | |
| 3,484,061 A | 12/1969 | Niemkiewicz | |
| 3,516,626 A | 6/1970 | Strance et al. | |
| 3,684,219 A | 8/1972 | King | |
| 3,708,200 A | 1/1973 | Richards | |
| 3,765,625 A | 10/1973 | Myhr et al. | |
| 3,827,660 A | 8/1974 | Doolittle | |
| 3,939,988 A | 2/1976 | Wellman | |
| 3,943,657 A | 3/1976 | Leckie | |
| 3,980,259 A | 9/1976 | Greenhalgh et al. | |
| 4,067,139 A | 1/1978 | Pinkerton et al. | |
| 4,079,901 A | 3/1978 | Mayhew et al. | |
| 4,143,840 A | 3/1979 | Bernard et al. | |
| 4,147,317 A | 4/1979 | Mayhew et al. | |
| D256,816 S | 9/1980 | McMahon et al. | |
| 4,236,686 A | 12/1980 | Barthelme et al. | |
| 4,238,093 A | 12/1980 | Siegel et al. | |
| 4,279,195 A | 7/1981 | Miller | |
| 4,296,894 A | 10/1981 | Schnabele et al. | |
| 4,296,898 A | 10/1981 | Watson | |
| 4,311,290 A | 1/1982 | Koper | |
| 4,408,737 A | 10/1983 | Schwaerzler | |
| 4,410,151 A | 10/1983 | Hoppner et al. | |
| 4,471,923 A | 9/1984 | Hoppner et al. | |
| 4,523,729 A | 6/1985 | Frick | |
| 4,566,658 A | 1/1986 | Di Giovanniantonio et al. | |
| 4,678,143 A | 7/1987 | Griffin | |
| 4,730,793 A | 3/1988 | Thurber, Jr. et al. | |
| 4,753,400 A | 6/1988 | Reuter et al. | |
| 4,790,497 A | 12/1988 | Yoffe et al. | |
| 4,809,933 A | 3/1989 | Buzby et al. | |
| 4,842,222 A | 6/1989 | Baird | |
| 4,909,458 A | 3/1990 | Martin | |
| 4,979,701 A | 12/1990 | Colarik et al. | |
| 5,007,875 A | 4/1991 | Dasa | |
| 5,039,034 A | 8/1991 | Burgess et al. | |
| 5,042,750 A | 8/1991 | Winter | |
| 5,054,717 A | 10/1991 | Taylor | |
| 5,109,788 A | 5/1992 | Heinzmann | |
| 5,119,935 A | 6/1992 | Stump et al. | |
| 5,253,605 A | 10/1993 | Collins | |
| 5,253,606 A | 10/1993 | Ortelli | |
| 5,509,624 A | 4/1996 | Takahashi | |
| 5,583,311 A | 12/1996 | Rieger | |
| 5,655,944 A | 8/1997 | Fusselman | |
| 5,687,930 A | 11/1997 | Wagner et al. | |
| 5,906,336 A | 5/1999 | Eckstein | |
| 6,264,140 B1 | 7/2001 | McGeer et al. | |
| 6,457,673 B1 | 10/2002 | Miller | |
| 6,478,650 B1 | 11/2002 | Tsai | |
| 6,835,045 B1 | 12/2004 | Barbee et al. | |
| 7,175,135 B2 | 6/2005 | Dennis et al. | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,114,680 B2 | 10/2006 | Dennis | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,152,827 B2 | 12/2006 | McGeer | |
| 7,165,745 B2 | 1/2007 | McGeer et al. | |

FOREIGN PATENT DOCUMENTS

| | | |
|---|---|---|
| FR | 854371 | 4/1940 |
| GB | 2 080 216 A | 2/1982 |
| GB | 2 150 895 A | 7/1985 |
| GB | 2 219 777 A | 12/1989 |
| IL | 76726 | 1/1991 |
| JP | 07-304498 | 11/1995 |
| WO | WO-00/75014 A1 | 12/2000 |
| WO | WO-01/07318 A1 | 2/2001 |

OTHER PUBLICATIONS

Dickard, H. E. "Mini-RPV Recovery System Conceptual Study," final report, U. S. Army Air Mobility Research and Development Laboratory, Fort Eustis, Virginia, Aug. 1977, Contract DAAJ02-76-C-0048, Report No. USAAMRDL-TR-77-24.

Robinson, Russell Norman, "Dynamic Analysis of a Carousel Remotely Piloted Vehicle Recovery System," master's thesis, Naval Post-Graduate School, Monterey, California, Dec. 1977, Thesis No. ADA052401.

Whitmore, Stephen A. et al., "Development of a Closed-Loop Strap Down Attitude System for an Ultrahigh Altitude Flight Experiment," technical memorandum, NASA Dryden Flight Research Center, Edwards, California, Jan. 1997, Report No. NASA TM-4775.

* cited by examiner

SYSTEMS AND METHODS FOR CAPTURING AND CONTROLLING POST-RECOVERY MOTION OF UNMANNED AIRCRAFT

TECHNICAL FIELD

The present disclosure relates generally to systems and methods for capturing unmanned aircraft and controlling post-recovery motion of the captured aircraft.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras can perform a wide variety of surveillance missions, including spotting schools of fish for the fisheries industry, monitoring weather conditions, providing border patrols for national governments, and providing military surveillance before, during, and/or after military operations.

Many unmanned aircraft systems (which can include the aircraft itself along with launch devices and recovery devices), however, can be difficult to install and operate in cramped quarters, such as the deck of a small fishing boat, land vehicle, or other craft. Accordingly, operating such aircraft systems often includes retrieving or capturing the aircraft with a vertically oriented flexible recovery line when space is insufficient for a normal landing run. While this technique has proven successful in many instances, there is a continual need to improve the effectiveness of systems with which aircraft are captured.

DETAILED DESCRIPTION

A. Overview

The present disclosure describes systems and methods for capturing and controlling post-recovery motion of unmanned aircraft. An aircraft system in accordance with one embodiment of the invention, for example, can include a line capture assembly carried by an unmanned aircraft having a fuselage and a lifting surface. The line capture assembly can include a flexible support line having a first portion attached to an attachment point on the fuselage and a second portion extending from the attachment point spanwise along the lifting surface of the aircraft. The line capture assembly can also include an engagement device coupled to the second portion of the support line. The engagement device is releasably secured to the lifting surface.

An aircraft system in accordance with another embodiment of the invention can include an unmanned aircraft having a fuselage and a pair of wings extending from the fuselage. The aircraft system can also include a line capture assembly carried by the aircraft. The line capture assembly is configured to releasably secure the aircraft to a flexible recovery line when the aircraft intercepts the recovery line. The line capture assembly can include one or more flexible support lines coupled to an anchor point on the fuselage. The support line(s) extend across at least a portion of the fuselage and spanwise along the corresponding wing to an outboard edge of the wing. The support line(s) can, for example, extend spanwise along the wing at least proximate to a leading edge of the corresponding wing. The line capture assembly can also include one or more capture devices coupled to the corresponding one or more support lines. The capture device(s) are releasably secured to the wing and positioned to receive the recovery line and at least temporarily secure the line capture assembly to the recovery line.

Another aspect of the invention is directed to a method for capturing an unmanned aircraft in flight. The method can include flying an unmanned aircraft to intercept a flexible recovery line. The unmanned aircraft has a lifting surface and a line capture assembly carried by the aircraft. The method can also include receiving the recovery line at an engagement device of the line capture assembly. The engagement device is attached to a flexible support line carried by the aircraft and coupled to an attachment point on the fuselage. The method can further include releasably securing the recovery line to the line capture assembly by (a) at least temporarily arresting the recovery line with the engagement device, and (b) suspending the aircraft from the support line after at least temporarily arresting the recovery line.

Many specific details of certain embodiments of the invention are set forth in the following description and in FIGS. 1-5 to provide a thorough understanding of these embodiments. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
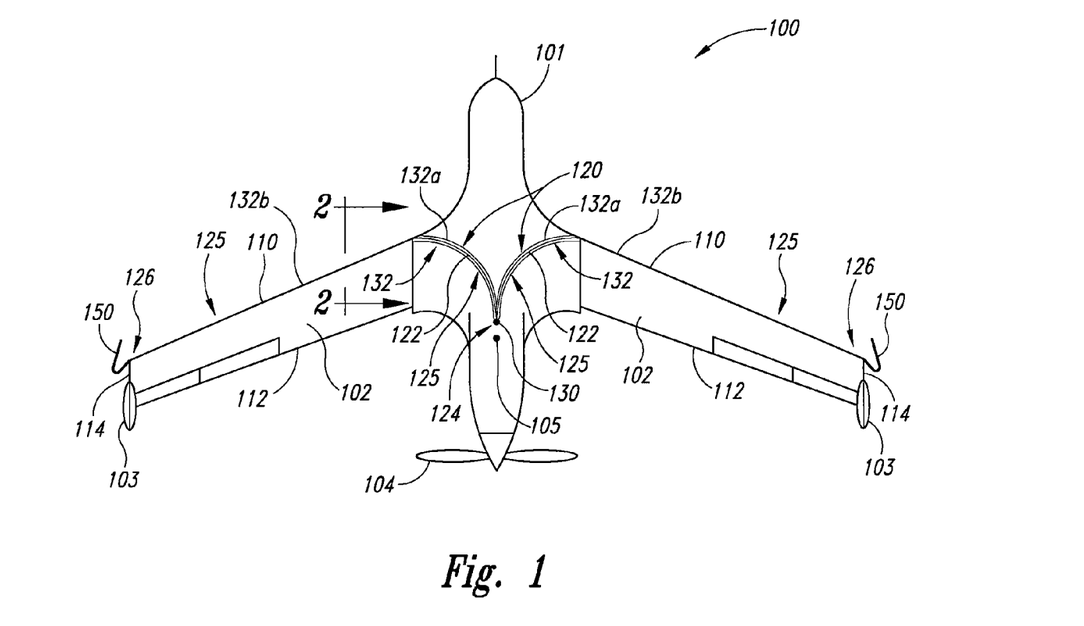
FIG. 1 is a partially schematic, top plan view of an unmanned aircraft including a line capture assembly configured in accordance with an embodiment of the invention.

B. Embodiments of Systems and Methods for Capturing and Controlling Post-Recovery Motion of Unmanned Aircraft FIG. 1 is a partially schematic, top plan view of an unmanned aircraft 100 including a line capture assembly 120 configured in accordance with an embodiment of the invention. The unmanned aircraft 100 can include a fuselage 101, a pair of wings or lifting surfaces 102 extending outwardly from the fuselage 101, and a propeller 104 positioned at the aft end of the fuselage 101 to propel the aircraft 100 during flight. The individual wings 102 include a leading edge 110, a trailing edge 112, and an outboard edge 114. Each wing 102 can also include an upwardly extending winglet 103 at the outboard edge 114 for lateral stability and control. The line capture assembly 120 is configured to engage a flexible recovery line (not shown) to releasably and securely attach the aircraft 100 to the recovery line and control post-recovery motion of the aircraft 100. Further details regarding the line capture assembly 120 and methods for capturing the aircraft 100 are described below with reference to FIGS. 2-3G.

The line capture assembly 120 in the embodiment illustrated in FIG. 1 includes one or more flexible support lines (e.g., ropes) or cables 122 attached to the fuselage 101 and extending along the span of each wing 102 at or proximate to the leading edge 110 of the corresponding wing 102. More specifically, each support line 122 includes a first portion 124 attached to an attachment or anchor point 130 on the fuselage 101 and a second portion 125 extending through grooves or channels 132. The grooves 132 can include, for example, first groove portions 132a in the fuselage 101 and second groove portions 132b extending spanwise at or proximate to the leading edge 110 of the corresponding wings 102 (described in greater detail below with reference to FIG. 2). Each support line 122 also includes a third portion 126 at least proximate to the outboard edge 114 of each wing 102. The attachment point 130 is positioned at a point on the fuselage 101 forward of the aircraft's center of gravity 105. As discussed in greater detail below with reference to FIGS. 3A-3G, positioning the attachment point 130 forward of the center of gravity 105 can improve the stability of the aircraft during capture and post-capture operations.

Figure 2:
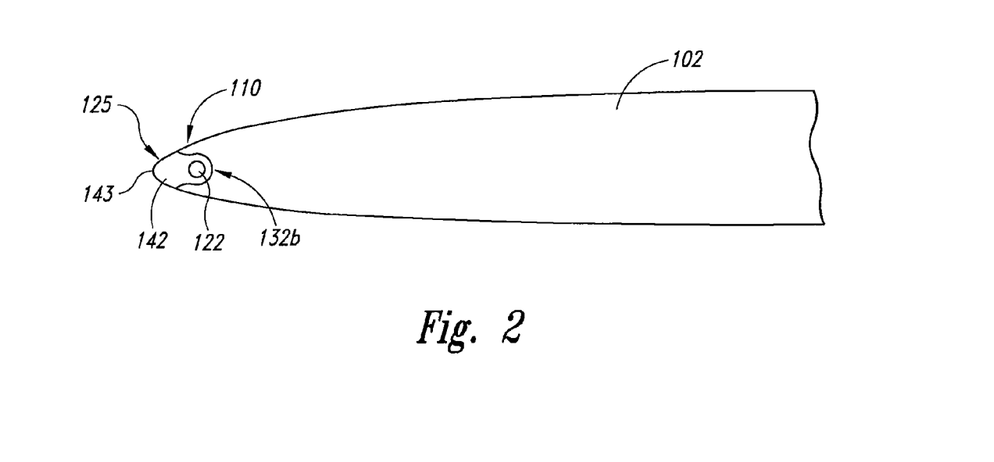
FIG. 2 is a partially schematic, cross-sectional view taken substantially along line 2-2 of FIG. 1.

FIG. 2 is a partially schematic, cross-sectional view of the wing 102 and a portion of the line capture assembly 120 taken substantially along line 2-2 of FIG. 1. As mentioned previously, the wing 102 includes the second groove portion 132b extending spanwise along substantially the entire leading edge 110 of the wing 102. The second groove portion 132b is sized to receive the support line 122 and a sheath or cover 142 that is molded or positioned around at least a portion of the support line 122. In the illustrated embodiment, for example, the cover 142 is a plastic (e.g., polyurethane) or rubber material that is molded completely around the support line 122 and the completed assembly is releasably pressed or positioned at least partially in the second groove portion 132b. In the illustrated embodiment, the cover 142 includes an aerodynamically shaped nose or leading edge portion 143. In this way, the line capture assembly 120 does not negatively affect or interfere with the aerodynamic performance of the aircraft 100 (FIG. 1). In other embodiments, the cover 142 may have a different shape, have a different configuration, and/or be composed of different materials. In one alternative embodiment, for example, the cover 142 may not completely surround the support line 122.

Referring back to FIG. 1, the first groove portions 132a in the fuselage 101 can have a similar configuration as the second groove portion 132b described in detail above with reference to FIG. 2. For example, the first groove portions 132a can be sized to receive the support line 122 and the sheath or cover (not shown in FIG. 1) surrounding the support line 122. Accordingly, the support line(s) 122 and the surrounding cover portions can be releasably pressed or positioned into the first groove portions 132a in much the same way as the support line 122 and corresponding cover portions 142 are pressed into the second groove portions 132b at the leading edge 110 of the respective wings 102. In several embodiments, the exposed or outer regions of the cover portions in the first groove portions 132a can be aerodynamically shaped and/or configured to match the configuration of the adjacent portions of the fuselage 101 so that the portion of the line capture assembly 120 in the first groove portions 132a does not negatively affect the aerodynamic performance of the aircraft 100.

The line capture assembly 120 can further include one or more engagement or capture devices 150 (e.g., hooks, cleats with corresponding latches, etc.) at the outboard edge 114 of each wing 102 and fixedly attached to the third portion 126 of the corresponding support line 122. The engagement devices 150 are configured to engage the recovery line (not shown) to releasably attach the line capture assembly 120 to the recovery line. The engagement devices 150 can be releasably held in place at the outboard edge 114 of the corresponding wings 102 using magnets (not shown) or other suitable fasteners configured to releasably hold the engagement device 150 in place during pre-capture operations.

FIGS. 3A-3G are partially schematic illustrations of a system and method for recovering an unmanned aircraft (e.g., the aircraft 100 described above) and controlling post-recovery motion of the aircraft in accordance with an embodiment of the invention. Beginning with FIG. 3A, the aircraft 100 can be captured by an aircraft handling system 300 configured to capture and control post-recovery motion of the aircraft 100. The aircraft handling system 300 can include a support platform 302, a support structure or boom 304 carried by the support platform 302, and a flexible recovery line 310 extended by gravity or other forces from the boom 304 transverse to the plane of FIG. 3A. The support platform 302 can include, for example, a trailer configured to be moved by a truck or other suitable land vehicle. In other embodiments, the support platform 302 can include other structures, such as a boat or other water vessel, a truck or other land vehicle, or a building. The boom 304 can include a knuckle or articulating boom or a boom having another arrangement (e.g., telescoping, scissors, parallel linkage, etc.). The recovery line 310 can include, for example, a polyester rope or another suitable type of rope or cable configured to releasably capture and support the aircraft 100.

Figure 3A:
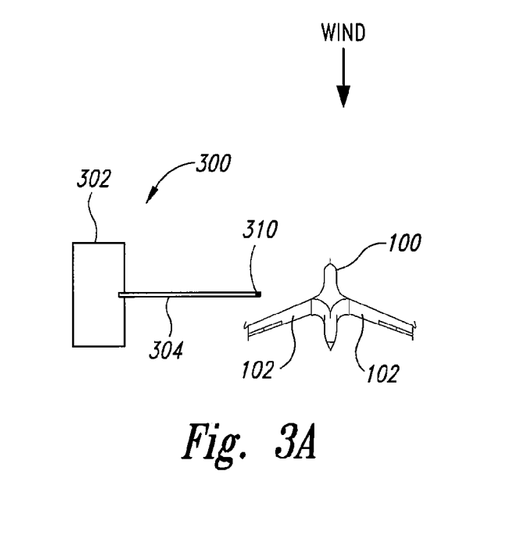
FIGS. 3A-3G are partially schematic illustrations of a system and method for recovering an unmanned aircraft and controlling post-recovery motion of the aircraft in accordance with an embodiment of the invention.
Figure 3B:
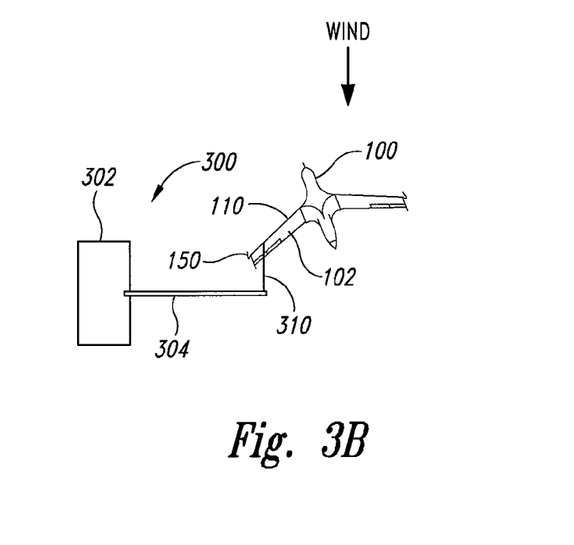
Figure 3C:
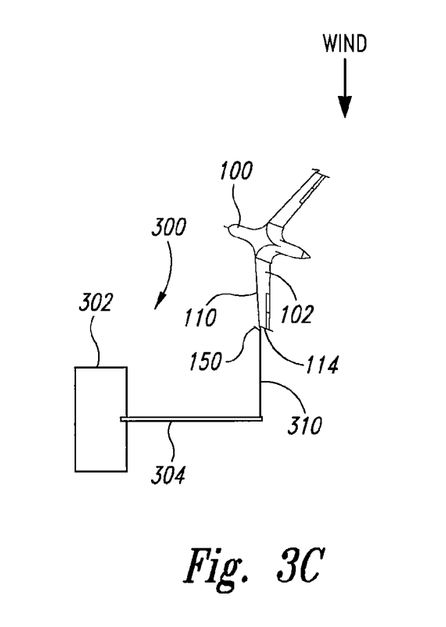

Referring next to FIG. 3B, the recovery line 310 slides outboard along the leading edge 110 of one of the wings 102 toward the corresponding engagement device 150 after the wing 102 strikes the recovery line 310. The force of impact with the recovery line 310 and the aircraft's momentum cause the aircraft 100 to begin to yaw toward the recovery line 310. Referring now to FIG. 3C, the engagement device 150 at the outboard edge 114 of the wing 102 receives and retains a portion of the recovery line 310, thus causing the aircraft 100 to further yaw or rotate toward the recovery line 310 and the support platform 302.

Figure 3D:
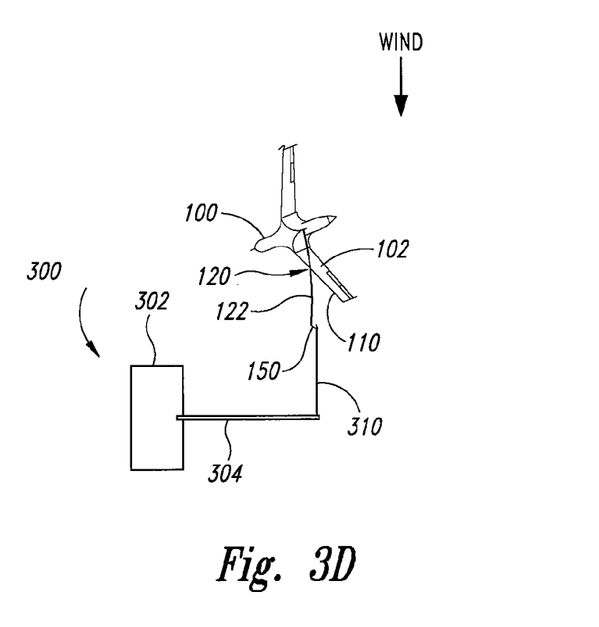
Figure 3E:
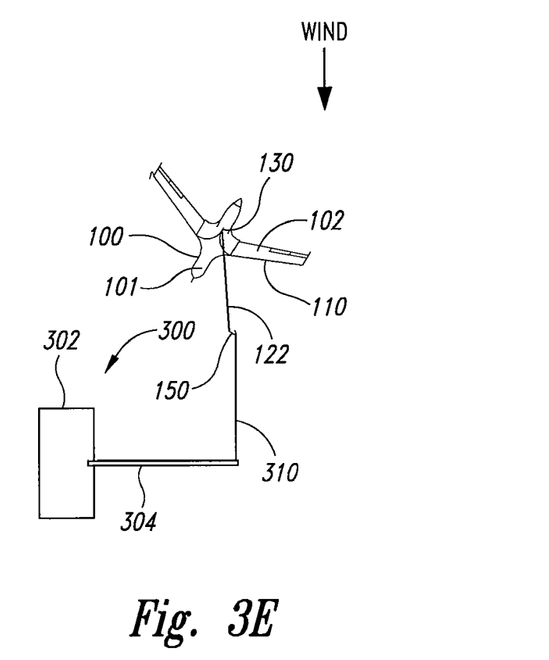
Figure 3F:
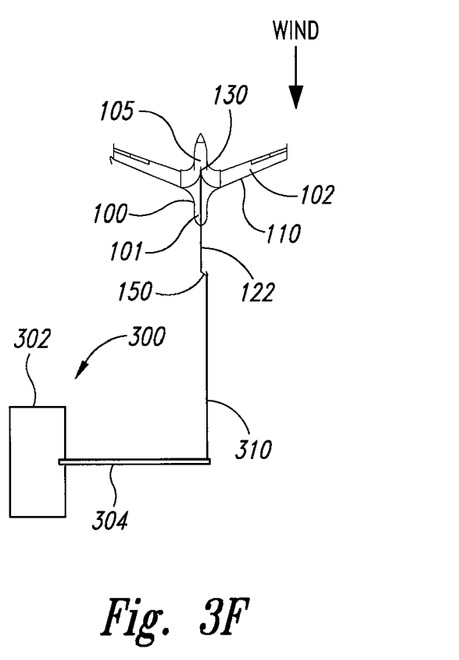

Referring now to FIG. 3D, the line capture assembly 120 begins to "peel" out or otherwise become detached from the leading edge 110 of the wing 102. More specifically, as the aircraft 100 continues to yaw and move downward in an arcuate-shaped path, the support line 122 and corresponding cover 142 (FIG. 2) are pulled out of the channel 140 (FIG. 2) at the leading edge 110 of the wing 102. As best seen in FIG. 3E, this process continues with the support line 122 and corresponding cover portions being pulled out of the channel 132 (FIG. 1) in the fuselage 101 until the support line 122 is completely peeled away from the leading edge 110 of the wing 102 and the fuselage 101. The support line 122 remains secured to the aircraft 100 only at the attachment point 130 and the aircraft continues to yaw until it has rotated about 180 degrees and the nose of the aircraft 100 is pointing in approximately the same direction as the wind (as shown in FIG. 3F). The aircraft 100, which is now traveling backward (with respect to the aircraft's original pre-capture direction of travel), continues to rapidly decelerate. This "backward" configuration is approximately the same stress position as the aircraft's launch position and, accordingly, capture and post-capture stresses on the airframe are expected to be generally similar to the launching stresses. Because the airframe and corresponding aircraft structures can be configured to withstand similar loads for both launch and capture operations, the design and construction of the aircraft can be simplified.

As discussed previously, the attachment point 130 is at a point on the fuselage 101 forward of the aircraft's center of gravity 105. One aspect of this feature is that as the aircraft 100 swings back toward the support structure 304 and the recovery line 310 after deceleration, the aircraft 100 will have a generally nose-high attitude. As discussed in greater detail below, this nose-high configuration can make it easier to stabilize the aircraft 100 in windy or unstable conditions. This configuration will also help keep the aircraft's wings 102 and control surfaces away from the recovery line 310, thus reducing the chances of damaging these relatively fragile portions of the aircraft 100. Furthermore, because the stresses on the aircraft during capture and post-recovery are primarily exerted on the airframe (via the attachment point 130), the wings 102, the aircraft's control surfaces, and other fragile portions of the aircraft 100 experience few or no stresses during capture operations.

Figure 3G:
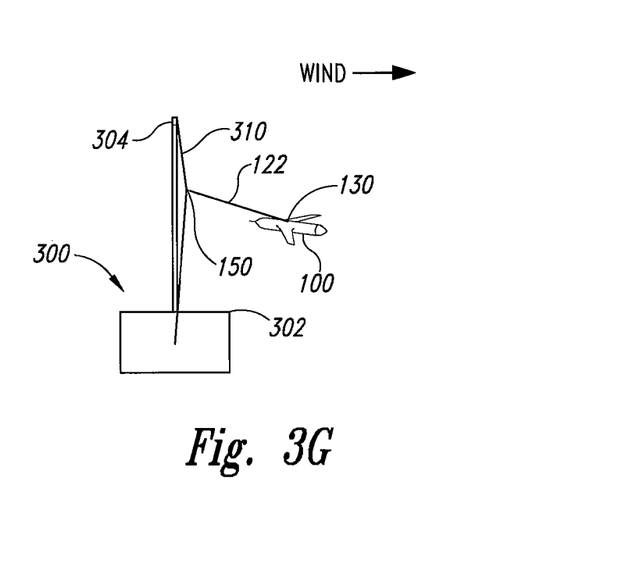
Figure 4A:
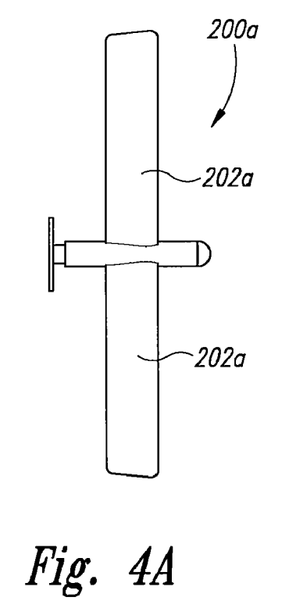
FIGS. 4A and 4B are partially schematic illustrations of aircraft configurations in accordance with further embodiments of the invention.
Figure 4B:
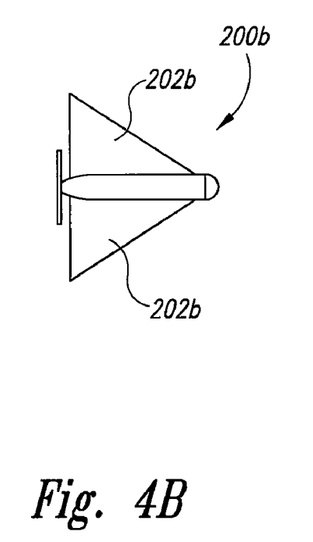

FIG. 3G is a partially schematic, side view of the aircraft 100 during capture operations in high wind conditions. The stage illustrated in FIG. 3G, for example, is after the stage described above with reference to FIG. 3F. After the initial capture stages, the aircraft 100 ultimately ends up facing into the wind in a slightly nose-up attitude. In several embodiments, the aircraft's autopilot can be used to stabilize the aircraft 100 (e.g., by moving one or more of the aircraft's control surfaces) immediately after capture. The aircraft 100 can be "flown" in this way until it is lowered down toward the ground and removed from the recovery line 310.

One advantage of this feature is that by flying the aircraft post-capture in much the same way that an aircraft in "flown" in a wind tunnel, the aircraft 100 can be stabilized quickly and safely, even in high wind conditions. This can help prevent damage to the aircraft 100 and/or the aircraft handling system 300 during capture operations. Furthermore, the ground clearance required post-capture can be reduced as compared with conventional capture systems, thereby increasing the size of the target zone of the recovery line 310. Accordingly, aircraft including the line capture assembly 120 can safely operate in much harsher or more unstable conditions than many conventional unmanned aircraft systems.

In other embodiments, the systems and methods described above with reference to FIGS. 1-3G can be used in conjunction with aircraft having configurations different than the aircraft 100 described above. For example, in one embodiment shown in FIG. 4A, an aircraft 200a can include generally unswept wings 202a. In another embodiment shown in FIG. 4B, an aircraft 200b can include delta wings 202b. Further, the aircraft can have propulsion systems that are different than and/or arranged differently than those described above with reference to FIGS. 1-3G. In any of these further embodiments, the aircraft can remain-compatible with some or all of the systems and methods above for capturing and controlling post-capture motion of the aircraft.

Figure 5:
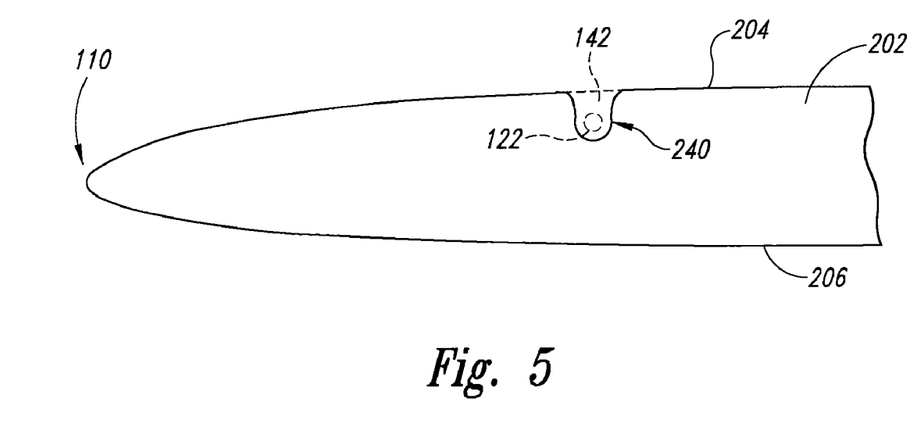
FIG. 5 is a partially schematic, cross-sectional view of a wing of an unmanned aircraft including a line capture assembly configured in accordance with another embodiment of the invention.

From the foregoing, it will be appreciated that specific embodiments of the invention have been described herein for purposes of illustration, but that various modifications may be made without deviating from the invention. For example, the support line 122 of the line capture assembly 120 can extend spanwise along the corresponding wing through a groove or channel that is not proximate to the leading edge of the corresponding wing. FIG. 5, for example, is a partially schematic, cross-sectional view of a wing 202 having a groove or channel 240 at an upper surface 204 of the wing 202. The support line 122 (shown in broken lines) and corresponding sheath or cover 142 (shown in broken lines) can extend through the groove 240. In still further embodiments, the line capture assembly 120 can extend through a groove or channel at a different portion of the wing 102. Regardless of where the groove is located along the corresponding wing(s) of the aircraft, the line capture assembly can function in generally the same way as described above with reference to FIGS. 3A-3G to capture and control post-recovery motion of the aircraft.

Aspects of the invention described in the context of particular embodiments may be combined or eliminated in other embodiments. For example, although the line capture assemblies described above all include portions extending along both wings of the aircraft, in other embodiments a line capture assembly may include a different number of support lines and/or the support lines may extend spanwise along only one wing of the aircraft. Moreover, the support line(s) can be held in place on the corresponding wings using other releasable retention techniques in addition to, or in lieu of, the grooves in the wings. In some embodiments, for example, straps or other releasable fasteners can be used to hold the support line(s) in place during pre-capture operations. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An aircraft system, comprising:
   a line capture assembly carried by an unmanned aircraft having a fuselage, a first lifting surface, and a second surface extending from the fuselage generally opposite to the first lifting surface, the line capture assembly including
   a first flexible support line having a first portion attached to an attachment point on the fuselage and a second portion extending from the attachment point spanwise along the first lifting surface of the aircraft;
   a first engagement device coupled to the second portion of the first support line and releasably secured at least proximate to an outboard edge of the first lifting surface;
   a second flexible support line having a first portion attached to the attachment point and a second portion extending from the attachment point spanwise along the second lifting surface; and
   a second engagement device coupled to the second portion of the second support line and releasably secured to at least proximate to an outboard edge of the second lifting surface.

2. The aircraft system of claim 1 wherein:
   the aircraft has a groove with (a) a first groove portion in the fuselage and extending between the attachment point and a leading edge of the first lifting surface, and (b) a second groove portion in the first lifting surface and extending spanwise along the first lifting surface at least proximate to the leading edge; and
   the first support line is at least partially received in both the first groove portion and the second groove portion.

3. The aircraft system of claim 2 wherein the first support line comprises a first flexible line and a molded cover at least partially surrounding the line.

4. The aircraft system of claim 3 wherein the molded cover has one or more aerodynamic surfaces shaped to form a generally continuous contour with adjacent surface portions of the aircraft when the first support line is at least partially received in the first and second grooves.

5. The aircraft system of claim 3 wherein the flexible line comprises a cable.

6. The aircraft system of claim 3 wherein the flexible line comprises a nylon rope.

7. The aircraft system of claim 3 wherein the molded cover is composed of at least one of a plastic material and a rubber material.

8. The aircraft system of claim 1 wherein the aircraft has a center of gravity, and wherein the attachment point on the fuselage is between a nose portion of the aircraft and the center of gravity.

9. The aircraft system of claim 1 wherein each engagement device comprises at least one of a hook and a cleat with a corresponding latch.

10. The aircraft system of claim 1 wherein:
the aircraft has a groove with (a) a first groove portion in the fuselage and extending between the attachment point and an upper surface of the first lifting surface, and (b) a second groove portion in the upper surface of the first lifting surface and extending spanwise along the first lifting surface: and
the first support line is at least partially received in both the first groove portion and the second groove portion.

11. An aircraft system, comprising:
an unmanned aircraft having a fuselage, and a first wing and a second wing extending from the fuselage; and
a line capture assembly carried by the aircraft and positioned to releasably secure the aircraft to a flexible recovery line when the aircraft intercepts the recovery line, the line capture assembly including
a first and a second flexible support line coupled to an anchor point on the fuselage and extending across at least a portion of the fuselage and spanwise along the corresponding first and second wings, respectively, to an outboard edge of the respective wing, wherein the first and second support lines extend spanwise along the wings at least proximate to a leading edge of the corresponding first and second wings; and
a first and a second capture device coupled to the first and second support lines, respectively, the first and second capture devices being releasably secured to the corresponding first and second wing and positioned to receive the recovery line and at least temporarily secure the line capture assembly to the recovery line.

12. The aircraft system of claim 11 wherein the aircraft further comprises:
a first channel extending between the anchor point and the outboard edge of the first wing, the first channel extending through at least a portion of the fuselage and spanwise along the first wing at least proximate to the leading edge of the first wing;
a second channel extending between the anchor point and the outboard edge of the second wing, the second channel extending through at least a portion of the fuselage and spanwise along the second wing at least proximate to the leading edge of the second wing and wherein the first support line is removably installed in the first channel, and the second support line is removably installed in the second channel.

13. The aircraft system of claim 12 wherein the individual support lines comprise a flexible line and a molded sheath at least partially surrounding the flexible line, and wherein the molded sheath has one or more aerodynamic surfaces shaped to correspond at least in part with surface portions of the aircraft adjacent to the area in which the support line is installed.

14. The aircraft system of claim 12 wherein the first support line and the second support line move independently from each other.

15. The aircraft system of claim 11 wherein the anchor point is positioned at a point on the fuselage forward of a center of gravity of the aircraft.

16. An aircraft system, comprising:
an unmanned aircraft having a fuselage, first and second lifting surfaces extending from the fuselage, and first and second grooves, each groove having (a) a first groove portion in the fuselage and extending between an attachment point on the fuselage and the corresponding lifting surface, and (b) a second groove portion in the respective lifting surface and extending spanwise along the lifting surface; and
a line capture assembly including
a first and a second flexible support line coupled to the attachment point on the fuselage and extending from the attachment point spanwise along the first and second lifting surfaces, respectively, wherein each support line is at least partially received in both the first groove portion and the second groove portion of the corresponding groove; and
a first and a second engagement device coupled to the first and second support lines, respectively, and releasably secured to the corresponding lifting surface.

17. The aircraft system of claim 16 wherein the first groove portions extend between the attachment point and leading edges of the individual lifting surfaces and the second groove portions extend spanwise along the corresponding lifting surface at least proximate to the leading edge.

18. The aircraft system of claim 16 wherein the first groove portions extend between the attachment point and an upper surface of the individual lifting surfaces and the second groove portions extend spanwise along the upper surface of the corresponding lifting surface.

19. An aircraft system, comprising:
an unmanned aircraft having a fuselage, a first lifting surface extending from the fuselage and a second lifting surface extending from the fuselage; and
a line capture assembly carried by the aircraft and positioned to releasably secure the aircraft to a flexible recovery line when the aircraft intercepts the recovery line, wherein the line capture assembly includes
a first and a second flexible support line coupled to the aircraft at an anchor point generally along a longitudinal axis of the aircraft and forward of a center of gravity of the aircraft, wherein the first and second support lines extend from the anchor point spanwise along at least a portion of the corresponding first and second lifting surfaces; and
a first and a second capture device coupled to a distal portion of the corresponding support line, wherein the first and second capture devices are releasably secured to the first and second lifting surfaces, respectively.

20. A method for capturing an unmanned aircraft in flight, the method comprising:
flying an unmanned aircraft to intercept a flexible recovery line, the unmanned aircraft having a lifting surface and a line capture assembly;
receiving the recovery line at an engagement device of the line capture assembly, wherein the engagement device is attached to a flexible support line carried by the aircraft and coupled to an attachment point on the fuselage; and releasably securing the recovery line to the line capture assembly by (a) at least temporarily arresting the recovery line with the engagement device and separating at least a portion of the engagement device from the aircraft, and (b) suspending the aircraft from the support line after at least temporarily arresting the recovery line.

21. The method of claim 20 wherein suspending the aircraft from the support line comprises suspending the aircraft from an attachment point positioned at a point on the fuselage between a center of gravity of the aircraft and a nose of the aircraft.

22. The method of claim 20 wherein suspending the aircraft from the support line comprises detaching a flexible line from an initial position in which the line and a molded cover at least partially surrounding the flexible line form a generally continuous contour with adjacent surface portions of the aircraft.

23. The method of claim 20, further comprising removably installing the support line in a groove having a first groove portion extending from the attachment point to the lifting surface and a second groove portion extending spanwise along the lifting surface at least proximate to a leading edge of the lifting surface before flying the unmanned aircraft to intercept the flexible recovery line.

24. The method of claim 23 wherein the support line includes a flexible line and a molded cover completely surrounding the flexible line, and wherein removably installing the support line comprises installing the support line into the first and second groove portions such that an outer surface of the molded cover is at least approximately flush with adjacent surface portions of the aircraft.

25. The method of claim 20 wherein the support line is removably installed within a groove in the fuselage and the lifting surface, the groove extending from the attachment point across at least a portion of the fuselage and extending spanwise across the lifting surface to at least proximate to an outboard edge of the lifting surface, and wherein at least temporarily arresting the recovery line with the engagement device and suspending the aircraft from the support line comprises completely removing the support line from the groove after at least temporarily arresting the recovery line and before suspending the aircraft.

26. The method of claim 20 wherein the engagement device comprises a hook releasably attached to the lifting surface at least proximate to an outboard edge of the lifting surface, and wherein receiving the recovery line at an engagement device comprises receiving the recovery line in a slot of the hook.

27. The method of claim 20, further comprising flying the aircraft so as to stabilize the aircraft after releasably securing the recovery line to the line capture assembly.

28. The method of claim 20, further comprising retrieving aircraft from the recovery line after releasably securing the recovery line to the line capture assembly.

29. A method for handling an unmanned aircraft in flight, the method comprising:
  installing a line capture assembly on an unmanned aircraft having a fuselage and a pair of wings, the line capture assembly including (a) one or more flexible support lines coupled to an anchor point at least generally along a longitudinal axis of the aircraft and extending spanwise along the corresponding wing to an outboard edge of the wing, and (b) one or more capture devices coupled to the corresponding one or more support lines and releasably secured to the corresponding wing;
  flying the aircraft so as to intercept a generally vertical flexible recovery line; and
  releasably securing the aircraft to the recovery line with the line capture assembly by
    engaging and releasably securing the recovery line with the capture device on the corresponding wing; and
    as the aircraft pivots toward the recovery line after engaging the recovery line with the capture device, releasing the support line from the lifting surface such that the aircraft is suspended from recovery line via the support line, wherein the support line is in contact with only the anchor point on the aircraft and the recovery line.

30. The method of claim 29 wherein installing a line capture assembly comprises installing the one or more support lines at least proximate to a leading edge of the corresponding wing.

31. The method of claim 29 wherein installing a line capture assembly comprises installing one or more support lines coupled to an anchor point positioned at a point on the fuselage forward of a center of gravity of the aircraft.

32. The method of claim 29 wherein:
  installing a line capture assembly comprises installing the one or more support lines within corresponding channels in the fuselage and the wings, the channels extending from the anchor point across at least a portion of the fuselage and extending spanwise across the wings to at least proximate to an outboard edge of the lifting surface; and
  releasing the support line from the lifting surface comprises completely removing the one or more support lines from the corresponding channels after engaging and releasably securing the recovery line with the capture device.

33. The method of claim 29, further comprising flying the aircraft with an approximately nose-up attitude and generally into the wind after releasably securing the recovery line to the line capture assembly.

34. The method of claim 29, further comprising retrieving aircraft from the recovery line after releasably securing the recovery line to the line capture assembly.

* * * * *